(12) United States Patent
Baughman et al.

(10) Patent No.: US 12,073,525 B2
(45) Date of Patent: *Aug. 27, 2024

(54) SYNCHRONIZING PHYSICAL AND VIRTUAL ENVIRONMENTS USING QUANTUM ENTANGLEMENT

(71) Applicant: International Business Machines Corporation, Armonk, NY (US)

(72) Inventors: Aaron K. Baughman, Cary, NC (US); Eduardo Morales, Key Biscayne, FL (US); Micah Forster, Round Rock, TX (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,352

(22) Filed: Oct. 5, 2023

(65) Prior Publication Data

US 2024/0029375 A1 Jan. 25, 2024

Related U.S. Application Data

(63) Continuation of application No. 17/844,352, filed on Jun. 20, 2022, now Pat. No. 11,842,455.

(51) Int. Cl.
*G06N 10/80* (2022.01)
*G06T 15/10* (2011.01)
(Continued)

(52) U.S. Cl.
CPC .......... *G06T 19/006* (2013.01); *G06N 10/80* (2022.01); *G06T 15/10* (2013.01); *G06V 20/20* (2022.01); *G06V 20/46* (2022.01)

(58) Field of Classification Search
CPC ....... G06T 19/006; G06T 15/10; G06N 10/80; G06V 20/20; G06V 20/46
See application file for complete search history.

(56) References Cited

U.S. PATENT DOCUMENTS

2008/0260257 A1* 10/2008 Rose ................ B82Y 10/00
382/195
2013/0207973 A1* 8/2013 Mattila ................ G06T 13/80
345/473

(Continued)

FOREIGN PATENT DOCUMENTS

WO WO-2020033807 A1 * 2/2020 ............. G06N 10/20

OTHER PUBLICATIONS

List of all IBM related dockets, 2023.

*Primary Examiner* — Jitesh Patel
(74) *Attorney, Agent, or Firm* — Garg Law Firm, PLLC; Rakesh Garg; Daniel Yeates

(57) ABSTRACT

An embodiment includes accessing captured video of a first physical object in a physical environment. The embodiment also includes detecting a feature of the first physical object in a first frame of the video. The embodiment encodes a first qubit with a first quantum state based on a first value of the feature of the first physical object, and then entangles the first qubit with a second qubit forming an entangled qubit pair. The embodiment detects a second quantum state of the second qubit of the entangled qubit pair and renders computer-generated content of a virtual environment that includes a computer-generated first virtual object that corresponds to the first physical object, where the rendering comprises determining a property of the first virtual object based on the detected second quantum state.

20 Claims, 10 Drawing Sheets

(51) Int. Cl.
 *G06T 19/00* (2011.01)
 *G06V 20/20* (2022.01)
 *G06V 20/40* (2022.01)

(56) References Cited

U.S. PATENT DOCUMENTS

2015/0052092 A1* 2/2015 Tang .................. G06N 10/20
 706/44
2021/0150403 A1* 5/2021 Grigoryan ............ H03K 19/195
2022/0391572 A1* 12/2022 Huffman ................ G06N 10/80

* cited by examiner

SYNCHRONIZING PHYSICAL AND VIRTUAL ENVIRONMENTS USING QUANTUM ENTANGLEMENT

BACKGROUND

The present invention relates generally to a method, system, and computer program product for implementing virtual environments. More particularly, the present invention relates to a method, system, and computer program product for synchronizing physical and virtual environments using quantum entanglement.

Molecules and subatomic particles follow the laws of quantum mechanics, a branch of physics that explores how the physical world works at the most fundamental levels. At this level, particles behave in strange ways, taking on more than one state at the same time, and interacting with other particles that are far away. Quantum computing harnesses these quantum phenomena to process information.

The computers we commonly use today are known as classical computers. A classical computer uses a classical processor fabricated using semiconductor materials and technology, a semiconductor memory, and a magnetic or solid-state storage device, in what is known as a Von Neumann architecture. Particularly, the processors in classical computers are binary processors, i.e., operating on binary data represented by 1 and 0.

A quantum processor uses the unique nature of entangled qubit devices (compactly referred to herein as "qubit," plural "qubits") to perform computational tasks. In the particular realms where quantum mechanics operates, particles of matter can exist simultaneously in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Classical computers encode information in bits. Each bit can take the value of 1 or 0. These 1 s and 0 s act as on/off switches that ultimately drive computer functions. Quantum computers, on the other hand, are based on qubits, which operate according to two key principles of quantum physics: superposition and entanglement. Superposition means that each qubit can represent both a 1 and a 0 inference between possible outcomes for an event. Entanglement means that qubits in a superposition can be correlated with each other in a non-classical way; that is, the state of one (whether it is a 1 or a 0 or both) can depend on the state of another, and that there is more information contained within the two qubits when they are entangled than as two individual qubits. Using these two principles, qubits operate as processors of information, enabling quantum computers to function in ways that allow them to solve certain difficult problems that are intractable using classical computers.

Extended reality (XR) technology refers to an emerging class of immersive display devices. Unlike a traditional computer monitor that provides a "window" through which a user can interact with a computer, an XR display device puts the user in the middle of a virtual environment. The virtual environment may include elements of the physical world around the user or elsewhere depending on the type of XR technology. The three main types of XR technology are virtual reality (VR), augmented reality (AR), and mixed reality (MR).

VR is a computer technology that uses virtual reality headsets or multi-projected environments, sometimes in combination with physical environments or props, to generate realistic images, sounds and other sensations that simulate a user's physical presence in a virtual or imaginary environment. A person using virtual reality equipment is able to "look around" the artificial world, and with high quality VR move around in it and interact with virtual features or items. The effect is commonly created by VR headsets consisting of a head-mounted display with a small screen in front of the eyes but can also be created through specially designed rooms with multiple large screens.

AR is a computer technology that combines the display of computer-generated objects with a direct view of the user's physical environment. Thus, real-world elements are "augmented" by computer-generated perceptual information, ideally across multiple sensory modalities, including visual, auditory, haptic, somatosensory, and olfactory. The overlaid sensory information can be constructive (i.e., additive to the natural environment) or destructive (i.e., masking of the natural environment) and is spatial registered with the physical world such that it is perceived as an immersive aspect of the user's physical environment. In this way, augmented reality alters one's current perception of a real-world environment, whereas virtual reality replaces the real-world environment with a simulated one.

MR is a computer technology that combines elements of VR and AR. MR provides a user with a view of a physical environment. However, unlike AR, which allows a user to directly view their physical environment through a transparent display, MR creates a virtual replica of the physical environment or parts of it. MR also allows completely virtual objects to be combined with the virtual copy of the physical environment, resulting in a computer-generated immersive combination of physical and virtual environments.

SUMMARY

The illustrative embodiments provide for synchronizing physical and virtual environments using quantum entanglement. An embodiment includes accessing captured video of a first physical object in a physical environment. The embodiment also includes detecting a feature of the first physical object in a first frame of the video. The embodiment also includes encoding a first qubit with a first quantum state based on a first value of the feature of the first physical object. The embodiment also includes entangling the first qubit with a second qubit forming an entangled qubit pair. The embodiment also includes detecting a second quantum state of the second qubit of the entangled qubit pair. The embodiment also includes rendering computer-generated content of a virtual environment that includes a computer-generated first virtual object that corresponds to the first physical object. The embodiment also includes where the rendering comprises determining a property of the first virtual object based on the detected second quantum state. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
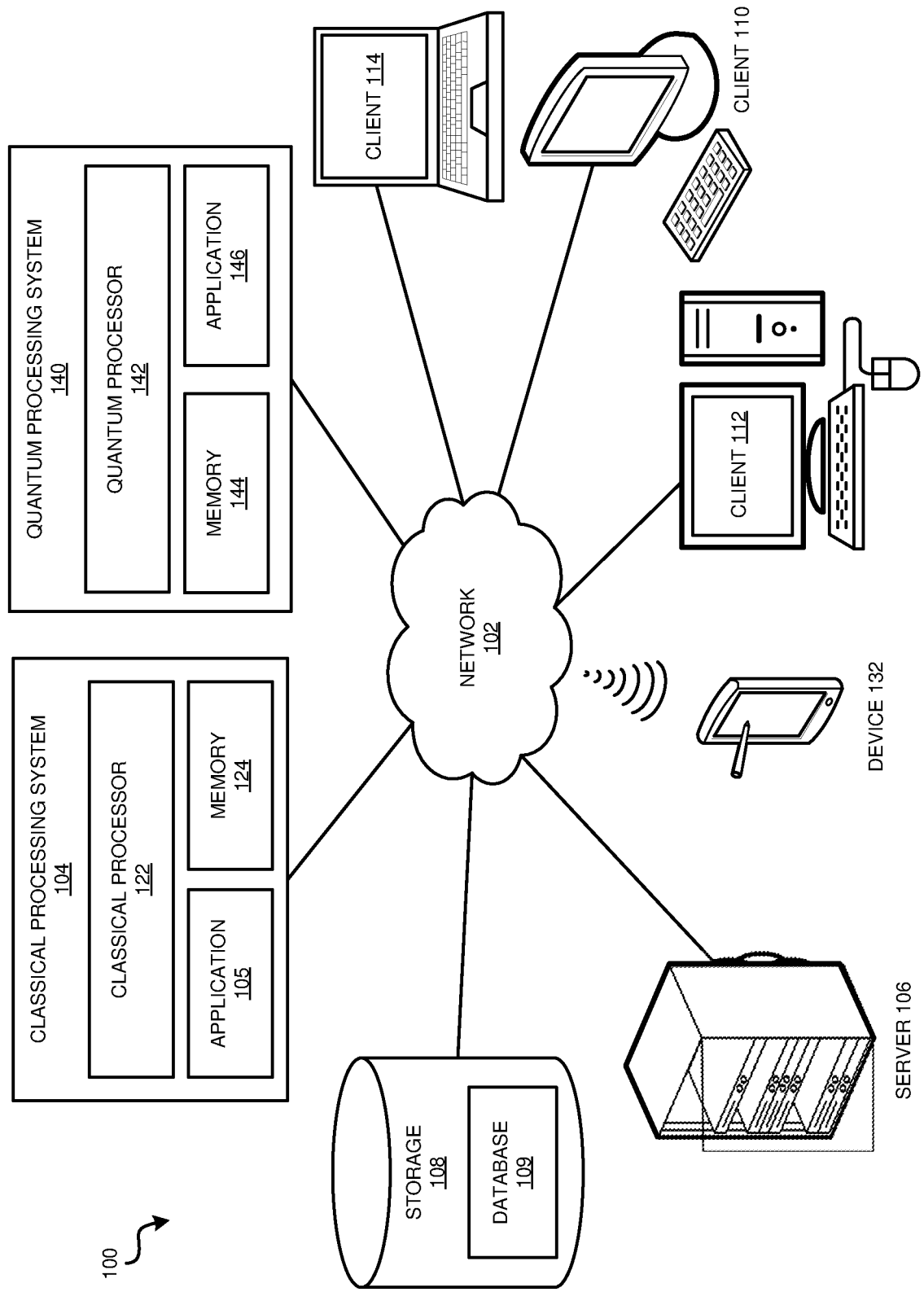
FIG. 1 depicts a block diagram of a network of data processing systems in which illustrative embodiments may be implemented.

In a typical XR system, a variety of different sensors are installed in both the physical and virtual spaces. These sensors acquire data from their environment and input into algorithms for understanding. Cameras and motion sensors are examples of sensors that capture data in a physical environment. Virtual sensors track computer-generated objects and user movements in a virtual environment. Virtual sensors can be installed, cloned, or removed from within the virtual environment at different times. Data generated by the various physical and virtual sensors is analyzed on an ongoing basis while the XR system is in operation. This data is used by the XR system as a basis for performing various different automation tasks or for making various different decisions.

A common task that utilizes the sensor data involves user transitioning between different views, such as between the physical and virtual environments or between different locations in a virtual environment. The XR system will need to rely on the sensor data to render visual content necessary to simulate the user's transition. Currently, when a user makes such a transition, the user may experience undesirable effects of the transition. For example, when users go between physical and virtual interfaces, there is a lot of friction.

For example, the amount of rendering performed in a busy virtual environment may overwhelm hardware or software components of the XR system. This often results in the user experiencing lag, such as significant discontinuities in the visual content being rendered and displayed. This can also result in the user experiencing disorientation or a lack of consistency between the different views. For example, some XR systems mask parts of the user's field of view during such transitions to reduce the amount of rendering that is required to complete the transition.

The friction experience during transitions may affect not only the user experience but also the artificial intelligence (AI) algorithms that are applied to the data gathered by the sensors. For example, an extractive summarizer on text might produce quite different results during the transition between environments. Initially, the features input into an algorithm should be transformed to match the existing environment. Over time, the decay of match subsides as the user adjusts to the new environment. The physical and virtual experiences slowly diverge as the user becomes acclimated. If the user switches back again, the user is annealed into the new environment.

The present embodiments recognize that, in order for user experiences during transitions between views or environments to be satisfactory, the transition should follow certain design principles: consistency, continuity, and complementary. The user transition between physical and virtual environments or between different locations in a virtual environment should result in a consistent experience. The user transition between physical and virtual environments or between different locations in a virtual environment should be a seamless transition. The two environments involved in the transition should be complementary.

According to some embodiments, a computer-implemented process provides for synchronizing physical and virtual environments using quantum entanglement. In some embodiments, the process accesses captured video of a physical object in a physical environment. In some embodiments, the process detects a feature of the physical object in a first frame of the video. A feature, also sometimes referred to as a "variable" or an "attribute," represents a measurable piece of data that can be used for analysis of an object. Non-limiting examples include hue, shape, location coordinates, direction of motion, or various others depending on what is being analyzed.

In some embodiments, the process encodes a first qubit with a quantum state based on a value of the feature of the physical object. The process entangles the first qubit with a second qubit forming an entangled qubit pair, also known as a Bell pair. The process detects a quantum state of the second qubit of the entangled qubit pair. In some embodiments, the process renders computer-generated content of a virtual environment that includes a computer-generated virtual object that corresponds to the first physical object. The process determines a property of the virtual object based on the detected second quantum state. In some embodiments, the process continues to update the quantum state of the first qubit according to how the value of the feature changes in subsequent frames. The quantum state of the second qubit will automatically change as the first qubit changes due to the entanglement between the two qubits. The virtual version of the physical object can thus be automatically synchronized with the physical object using quantum entanglement.

In some embodiments, the process determines a probability of a user transitioning between a first view and a second view based on inputs representative of user actions. In some embodiments, the transition between the first view and the second view is a transition from the physical environment to the virtual environment, from the virtual environment to the physical environment, or from one perspective point in the virtual environment to another perspective point in the virtual environment. In some embodiments, the process initiates a transition if the probability exceeds a threshold value.

In some embodiments, the process establishes, responsive to the probability exceeding the threshold value, a device window for both the virtual environment and the physical environment based on data associated with the user. In some embodiments, the device window can be a set of sensors or objects selected to limit the amount of processing required to transition the user from one view to another.

In some embodiments, the process encodes a first set of qubits with respective quantum states, where the quantum states are based on feature values of respective physical objects in the set of physical objects. The process then entangles the first set of qubits with respective qubits of a second set of qubits. The second set of qubits is used to synchronize virtual objects with their physical counterparts, which occurs automatically due to the entanglement.

In some embodiments, the process renders the transitioning between the first view and the second view, where the rendering comprises crossing feature vectors for the first set of physical objects with respective feature vectors for corresponding virtual objects. In some embodiments, the process renders the transitioning by also identifying physical objects not in the selected set of physical objects and virtual objects not in the selected set of virtual objects and crossing their respective feature vectors with themselves.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein. Additional data, operations, actions, tasks, activities, and manipulations will be conceivable from this disclosure and the same are contemplated within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

Figure 2:
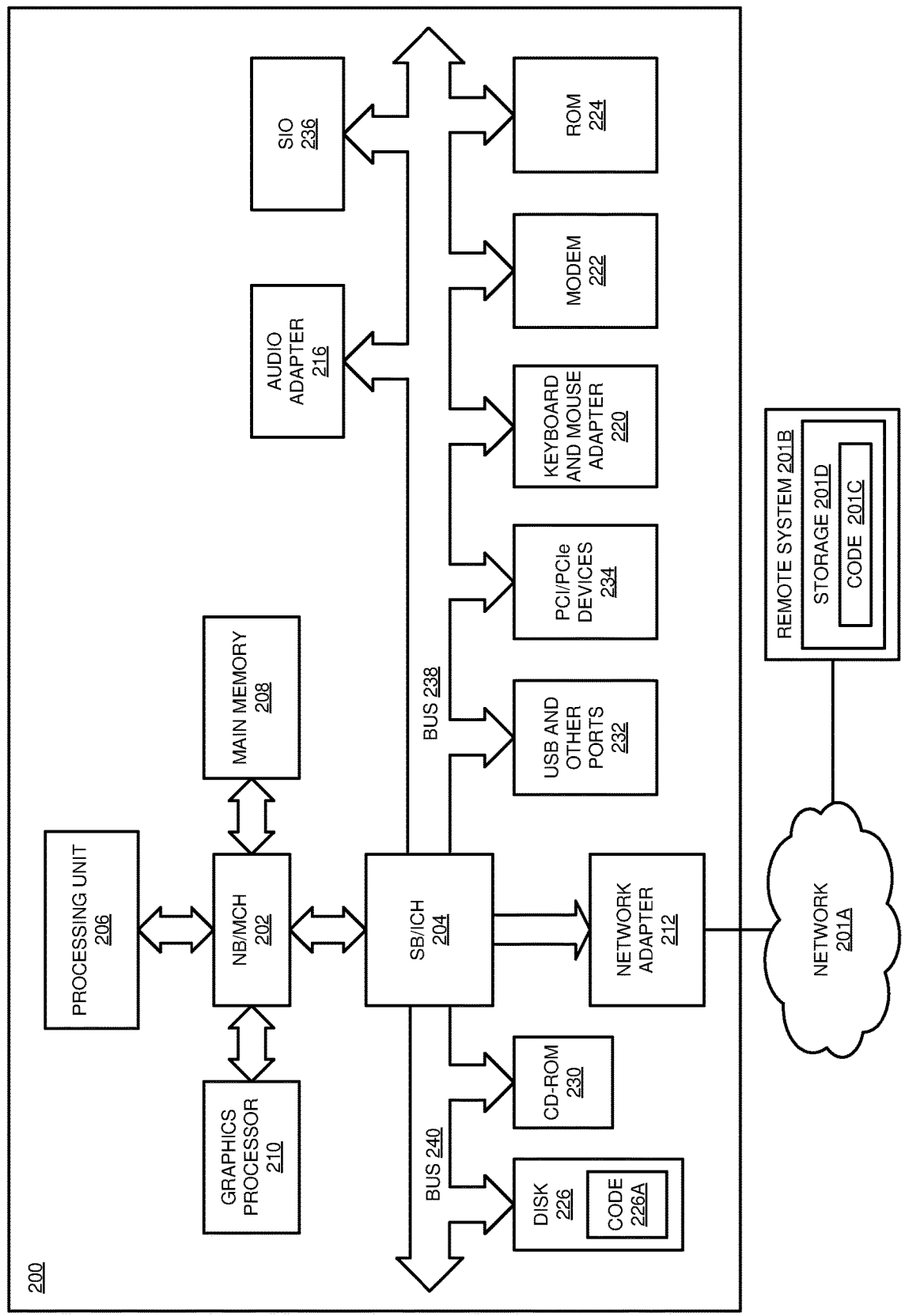
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Classical processing system 104 couples to network 102. Classical processing system 104 is a classical processing system. Software applications may execute on any data processing system in data processing environment 100. Any software application described as executing in classical processing system 104 in FIG. 1 can be configured to execute in another data processing system in a similar manner. Any data or information stored or produced in classical processing system 104 in FIG. 1 can be configured to be stored or produced in another data processing system in a similar manner. A classical data processing system, such as classical processing system 104, may contain data and may have software applications or software tools executing classical computing processes thereon.

Server 106 couples to network 102 along with storage unit 108. Storage unit 108 includes a database 109 configured to store neural network training data as described herein with respect to various embodiments. Server 106 is a classical data processing system. Processing system 140 couples to network 102.

Processing system 140 is a quantum data processing system. Software applications may execute on any quantum data processing system in data processing environment 100. Any software application described as executing in processing system 140 in FIG. 1 can be configured to execute in another quantum data processing system in a similar manner. Any data or information stored or produced in processing system 140 in FIG. 1 can be configured to be stored or produced in another quantum data processing system in a similar manner. A quantum data processing system, such as processing system 140, may contain data and may have software applications or software tools executing quantum computing processes thereon.

Clients 110, 112, and 114 are also coupled to network 102. A classical data processing system, such as server 106, or client 110, 112, or 114 may contain data and may have software applications or software tools executing classical computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several classical data processing systems, quantum data processing systems, and a data network as shown, whereas another embodiment can be implemented on a single classical data processing system or single quantum data processing system within the scope of the illustrative embodiments. Classical data processing systems 106, 110, 112, and 114 also represent example nodes in a cluster, partitions, and other configurations suitable for implementing an embodiment.

Device 132 is an example of a computing device described herein. For example, device 132 can take the form of a smartphone, a tablet computer, a laptop computer, client 110 in a stationary or a portable form, a wearable computing device, or any other suitable device. Any software application described as executing in another classical data processing system in FIG. 1 can be configured to execute in device 132 in a similar manner. Any data or information stored or produced in another classical data processing system in FIG. 1 can be configured to be stored or produced in device 132 in a similar manner.

Server 106, storage unit 108, classical processing system 104, quantum processing system 140, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to classical processor 122. Classical processor 122 may include its own data, boot files, operating system images, and applications. Data processing environment 100 may include additional memories, processors, and other devices that are not shown. Memory 124 includes application 105 that may be configured to implement one or more of the classical processor functions described herein for correcting bias on a hybrid classical-quantum computing system in accordance with one or more embodiments.

In the depicted example, memory 144 may provide data, such as boot files, operating system images, and applications to processor 142. Processor 142 may include its own data, boot files, operating system images, and applications. Data processing environment 100 may include additional memories, processors, and other devices that are not shown. Memory 144 includes application 146 that may be configured to implement one or more of the processor functions described herein in accordance with one or more embodiments.

In the depicted example, data processing environment 100 may include the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a classical client data processing system and a classical server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a classical data processing system in which illustrative embodiments may be implemented. Data processing system 200 is an example of a computer, such as classical processing system 104, server 106, or clients 110, 112, and 114 in FIG. 1, or another type of device in which computer usable program code or instructions implementing the processes may be located for the illustrative embodiments.

Data processing system 200 is described as a computer only as an example, without being limited thereto. Implementations in the form of other devices, such as device 132 in FIG. 1 and headset 302 in FIG. 3, may modify data processing system 200, such as by adding a touch or voice interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A network adapter 212 may include one or more devices used to transmit and receive data using wired and/or wireless connections, such as a modem, ethernet adapter, or wireless network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
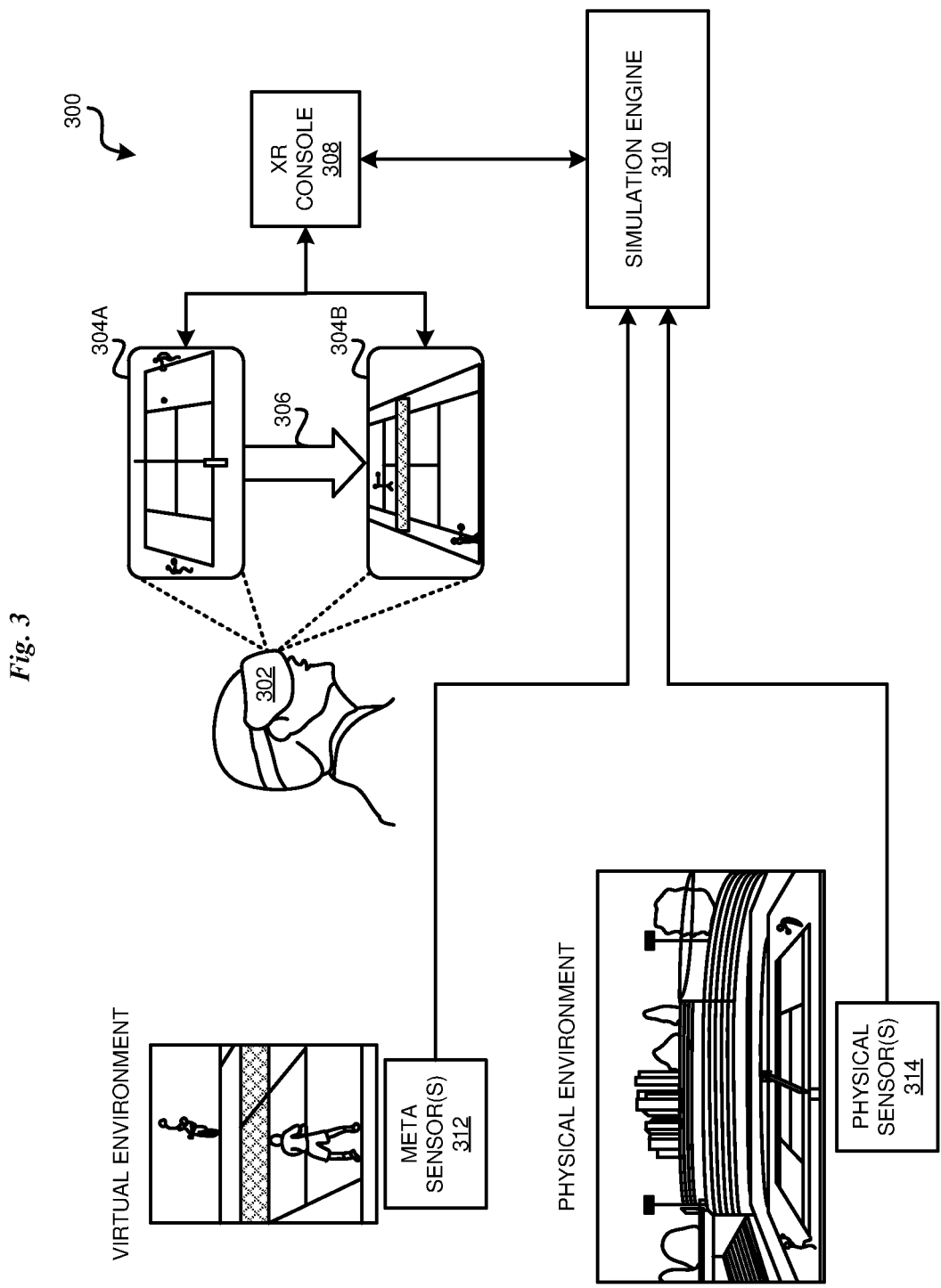
FIG. 3 depicts a block diagram of an example extended reality (XR) system in accordance with an illustrative embodiment.

With reference to FIG. 3, this figure depicts a block diagram of an example extended reality (XR) system 300 in accordance with an illustrative embodiment. In a particular embodiment, XR system 300 includes a simulation engine 310, which constitutes an example of application 105 of FIG. 1.

In some embodiments, XR system 300 is configured to allow a user to transition between different realities, such as transitioning between a computer-generated virtual environment the user's physical environment. In one embodiment, a user may wear a headset 302 that includes one or more displays that provide the user with an immersive view of a virtual environment, such as views 304A-304B. The views 304A-304B include examples of scenes, graphical images and/or computer-generated perceptual information that the headset 302 displays in the user's field of view.

In some embodiments, the headset 302 includes a visor, goggles, glasses, and other similar arrangements. In some embodiments, the headset 302 includes any one or more of the following: headphones to provide auditory feedback, a microphone to receive voice inputs from the user, vibration means to provide vibration feedback, and sensors to detect the user's movements.

In some embodiments, the headset 302 is in communication with an XR console 308. In some embodiments, the XR console 308 relays graphical information to the headset 302 from a simulation engine 310. In some embodiments, the simulation engine 310 provides instructions to display immersive visual content, for example, by executing program code including an application program related to an XR simulation. In an example shown in FIG. 3, an execution of the application program by simulation engine 310 may cause the headset 302 to render and display a first view 304A of a scene, where the first view 304A may be a stereoscopic image of a three-dimensional model associated with a combination of visual elements sensed by meta sensor(s) meta sensor(s) 312 (also referred to herein as virtual sensors) in a virtual environment and by physical sensor(s) 314 in a physical environment. The XR console 308 may send image data representative of the first view 304A to the headset 302, such that the first view 304A may be displayed by the headset 302.

The physical sensor(s) 314 may include one or more cameras, one or more orientation and position sensors (e.g., accelerometers, magnetometers, gyroscopes, Global Positioning System (GPS) receivers, one or more multi-degree-of-freedom (MDOF) inertial measurement units (IMUs), and so forth), and/or one or more light sensors, one or more presence sensors (e.g., motion sensors, ultrasound sensors, reflectance sensors, break-beam sensor, and so forth). The physical sensor(s) 314 may capture real-world images (e.g., images and/or real-time video data of the real-world environment). In some embodiments, the physical sensor(s) 314 may transmit the captured real-world images in substantially real-time.

In some embodiments, the physical sensor(s) 314 may include high resolution and/or high-speed cameras. For example, in some embodiments, the physical sensor(s) 314 may be 4K-resolution digital high-speed cameras (e.g., framerate exceeding about sixty frames per second and horizontal resolution in the order of 4,000 pixels). In some such embodiments, the physical sensor(s) 314 have high-speed and high-resolution capabilities, and the captured real-world images have high resolution and high three-dimensional (3D) depth, which may aid generation of XR graphics with high levels of realism.

In the illustrated example, the simulation engine 310 may be a mixed reality presentation system and the first view 304A may be of a tennis match within the virtual environment. The user may view the first view 304A on the headset 302 and may request a transition to a new view, as indicated by arrow 306, from the first view 304A to the second view 304B. As shown in FIG. 3, the second view 304B shows the tennis match from a different perspective compared to that of the first view 304A. In response to the request to transition to a new view, the simulation engine 310 generates visual content and streams the visual content to the headset 302 such that the visual content, when viewed by the user, simulates a seamless transition from a first point of view from which the user sees the first view 304A to a second point of view from which the user sees the second view 304B. In some embodiments, the simulation engine 310 continues to monitor what is happening in the physical environment (e.g., the movements of the players, the tennis ball, etc.) and synchronizes the computer-generated virtual environment such that the movements of the virtual objects match those of their physical counterparts.

In some embodiments, the XR console 308 is a computing device, such as a mobile computing device (e.g., smartphone), which includes a camera and MEMS (microelectromechanical systems) sensors, such as an accelerometer, GPS (Global Positioning System) and a solid-state compass, thereby enabling XR console 308 to be a suitable XR platform. In other embodiments, the XR console 308 is a home video game console system, a set-top box, or a media player. In still further embodiments, the XR console 308 is integrated into the headset 302 rather than being a separate component.

In some embodiments, the headset 302 includes hardware and/or software that is configured to monitor the user's heart rate, the user's body temperature, levels of a user's sweat, etc. In some embodiments, this monitored information about the user may be transmitted to the XR console 308 and may be used to monitor the user's experience while transitioning between physical and virtual environments or between locations in the virtual environment (e.g., from the point of view for first view 304A to the point of view for second view 304B.

Figure 4:
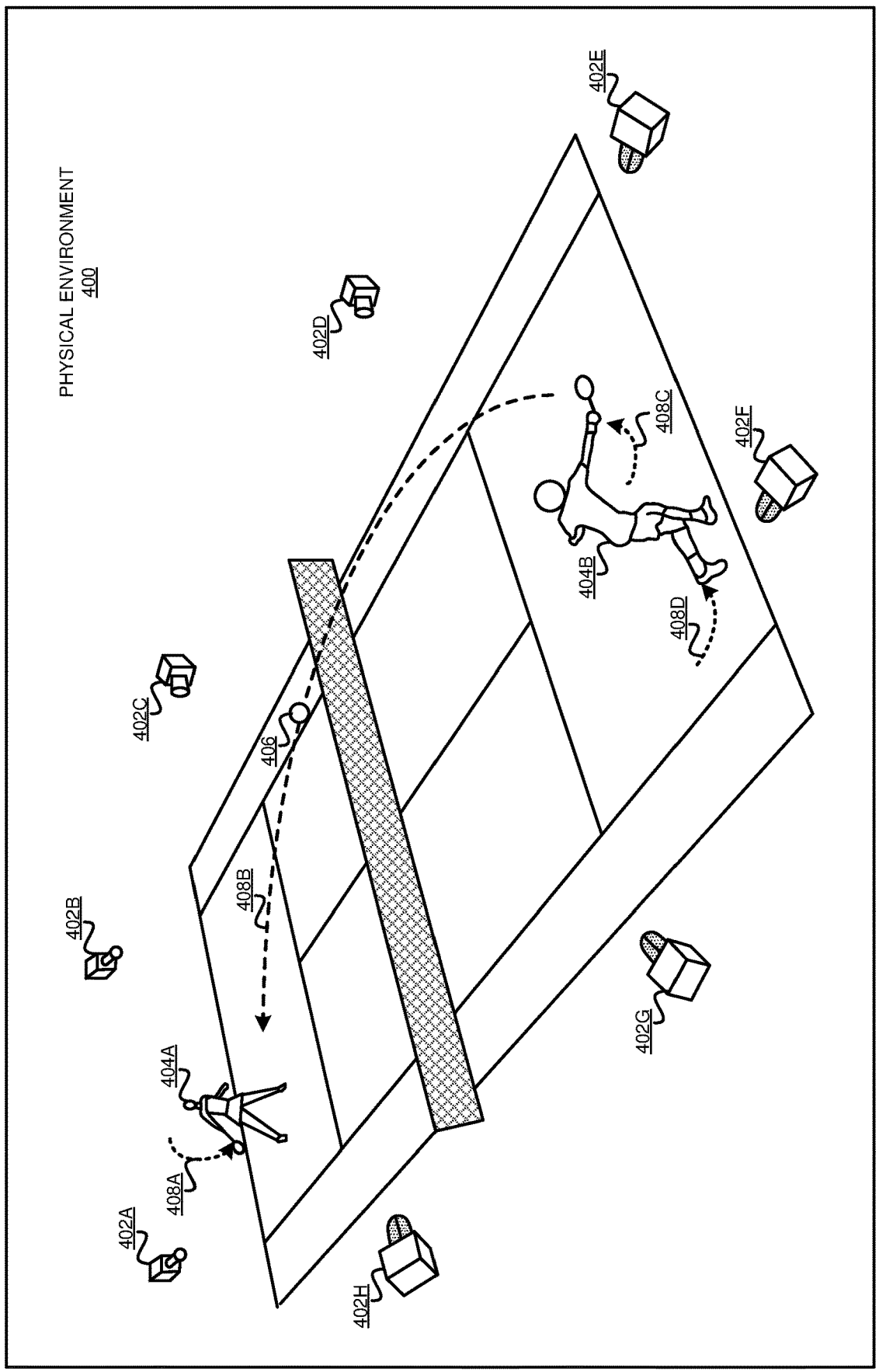
FIG. 4 depicts a block diagram of an exemplary physical environment that is being tracked and recreated as part of an XR display in accordance with an illustrative embodiment.

With reference to FIG. 4, this figure depicts a block diagram of an exemplary physical environment 400 that is being tracked and recreated as part of an XR display in accordance with an illustrative embodiment. In a particular embodiment, the physical environment 400 is monitored by a plurality of sensors 402A-402H, which constitute examples of physical sensor(s) 314 of FIG. 3.

In some embodiments, the XR system 300 of FIG. 3 includes physical sensors 402A-402H that collectively operate as an object-tracking sensor system. The sensors 402A-402H are each in communication with other components of the system 300, for example the simulation engine 310 of FIG. 3. In some embodiments, the sensors 402A-402H are configured to track objects in the XR field of view of user, which may or may not be local to the user. An "object," as used herein, refers to something material (whether graphical image or physical) that can be perceived by a user's senses.

In some embodiments, the simulation engine 310 uses data from the sensors 402A-402H to provide a real time image stream to the display of headset 302. For example, in the illustrated example, the simulation engine 310 uses data from the sensors 402A-402H to generate an image stream depicting a tennis match between players 404A-404B. In this example, the sensors 402A-402H track objects in their respective fields of view, such as movement of the tennis ball 406 and actions of the first player 404A and second player 404B. For example, in some embodiments, the sensors 402A-402H comprise cameras that track the movement of the tennis ball 406 and the player's hands, arms, legs, feet, head and torso, such as the arm swing indicated by arrow 408A, the track of the tennis ball indicated by arrow 408B, the arm swing indicated by arrow 408C, and the leg/torso movement indicated by arrow 408D.

In some embodiments, the sensors 402A-402H include one or more cameras, such as one or more two-dimensional cameras, one or more three-dimensional cameras, one or more infrared cameras, and one or more time of flight (ToF) cameras. In some embodiments, the sensors 402A-402H include one or more cameras having a complementary metal-oxide-semiconductor (CMOS) or charged-coupled device (CCD) image sensor, or any other form of sensor to form images. In some embodiments, the sensors 402A-402H include a camera with an infrared filter, which can be used for object tracking. In some embodiments, the sensors 402A-402H include an RGB camera, which can be used for generation of augmented reality simulations. In some embodiments, different frames of a single camera may be processed in an alternating manner, e.g., with an infrared filter and for RGB, instead of separate cameras. Images of more than one camera may be stitched together to generate a continuous view for the user.

Figure 5:
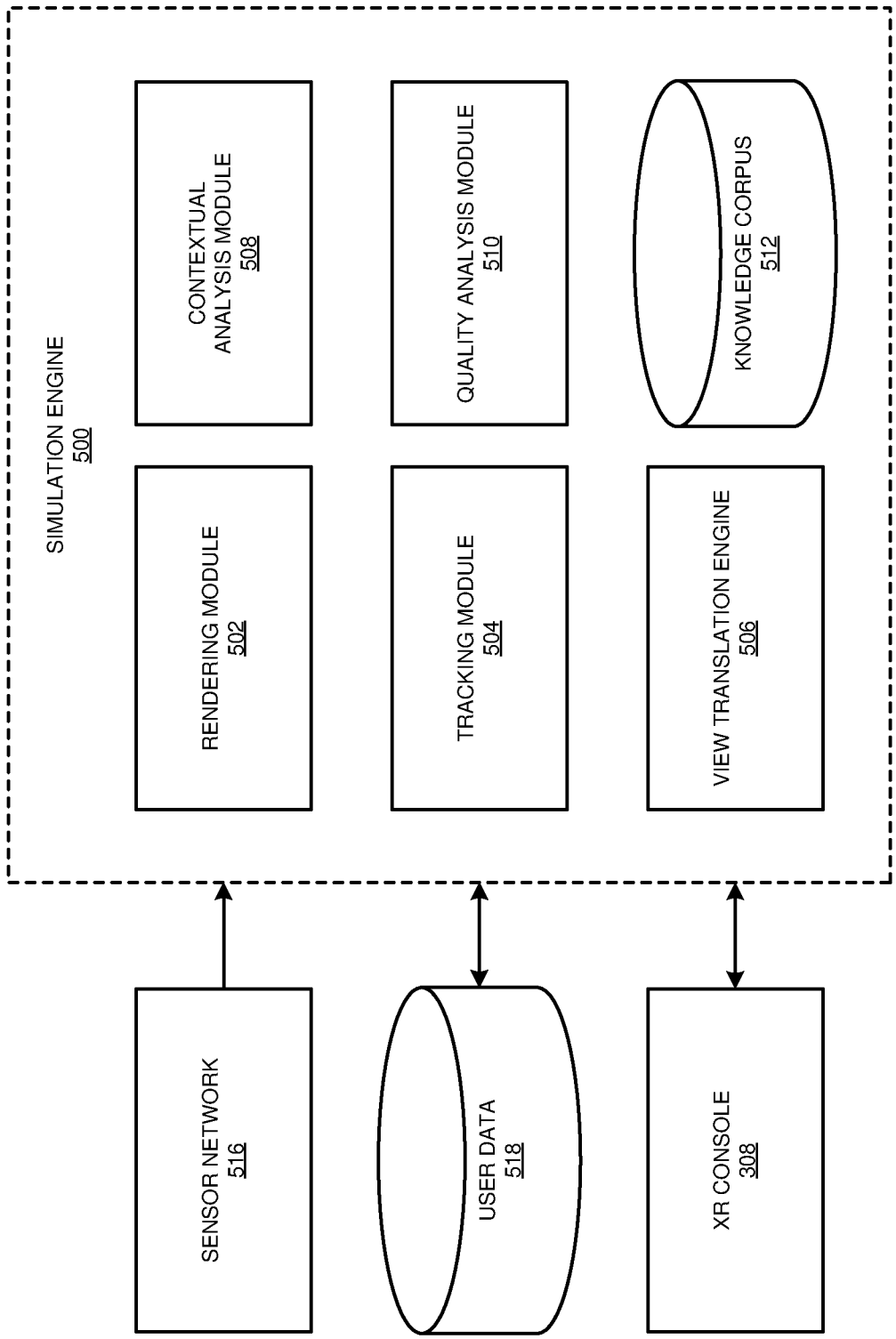
FIG. 5 depicts a block diagram of an exemplary simulation engine in accordance with an illustrative embodiment.

With reference to FIG. 5, this figure depicts a block diagram of an exemplary simulation engine 500 in accordance with an illustrative embodiment. In a particular embodiment, the simulation engine 500 is an example of simulation engine 310 of FIG. 3.

In some embodiments, the simulation engine 500 includes a rendering module 502, a tracking module 504, a view translation engine 506, a contextual analysis module 508, and a quality analysis module 510 that read and write data to one or more computer readable storage media, such as a database storing a knowledge corpus 512 and a database storing user data 518. In alternative embodiments, the simulation engine 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the simulation engine 500 implements an application program for generating XR visual content using captured real-world images merged with computer-generated virtual elements using the sensor data received from a sensor network 516 and virtual sensor data received from the tracking module 504. In some embodiments, the sensor network 516 is an example of physical sensor(s) 314 of FIG. 3 and includes one or more of sensors 402A-402H of FIG. 4. In some embodiments, the tracking module 504 is an example of meta sensor(s) 312 of FIG. 3. In some embodiments, the tracking module 504 includes one or more virtual sensors that track and monitor computer-generated virtual objects in a virtual environment. In some embodiments, the virtual sensors of the tracking module 504 collect data representative of a plurality of properties of each sensed virtual object. The data collected by the tracking module 504 is provided to the view translation engine 506 to generate and synchronize feature vectors for the virtual objects and corresponding physical objects sensed by sensors in the sensor network 516. In some embodiments, the data collected is also provided to the rendering module 502.

In some embodiments, the rendering module 502 comprises a computer graphics generation system configured to receive sensor data and render presentation content (e.g., graphical images or video streams) suitable for display by a display device, for example the headset 302 of FIG. 3. In some embodiments, the rendering module 502 comprises processing circuitry and/or software instructions for generating captured real-world images merged with the virtual graphics. For example, in some embodiments, the rendering module 502 comprises a general-purpose processor, system-on-chip (SoC) device, an application-specific integrated circuit (ASIC), or some other processor configuration.

In some embodiments, the rendering module 502 comprises any suitable hardware, software (e.g., a game engine), and algorithms for generating an XR environment. For example, in some embodiments, the rendering module 502 includes or accesses a model (e.g., a three-dimensional model with spatial information, a computer-aided design (CAD) file) of a virtual environment that includes fixed-position virtual elements. In some such embodiments, the rendering module 502 uses the model, together with data from the sensor network 516 and the tracking module 504 to provide signals representative of presentation content to the XR console 308. In particular, the rendering module 502 receives streaming data from the sensor network 516 and the tracking module 504 and dynamically updates the presentation content according to changes in the physical and/or virtual environments as indicated by the streaming data.

In some embodiments, the sensor data from the sensor network 516 and/or tracking module 504 is also provided to the contextual analysis module 508. The contextual analysis module 508 is configured to analyze the sensor data and identify a context associated with the sensor data. In some embodiments, the contextual analysis module 508 uses known machine learning techniques to determine higher-level context descriptions from the received sensor data. In some embodiments, the contextual analysis module 508 determines a context by analyzing the cultural, historical, and situational aspects surrounding the sensor data. The specificity of the identified context may vary according to factors that are implementation-specific, such as system parameters, user preferences, and typical usage. As non-limiting examples, in some embodiments, the contextual analysis module 508 differentiates a business context (e.g., virtual business meeting) from a recreational context (e.g., sporting event), differentiates types of recreational events (e.g., concert, sporting event, amusement park, or museum tour), and/or differentiates types of sporting events (e.g., tennis, badminton, rugby, or football).

In some embodiments, the sensor data analyzed by the contextual analysis module 508 originates from a plurality of different sensors. In some embodiments, the sensor network 516 may include hundreds or thousands of sensors of various types generating varying amounts of data at varying rates. In some implementations or scenarios, the amount and frequency of incoming sensor data may overload system resources during the rendering process, resulting in degraded performance that can negatively affect the user experience. This is often a problem during user transitions, for example when the user is transitioning between different views, such as between different locations in a virtual environment (e.g., between the first view 304A and the second view 304B in FIG. 3) or between the physical and virtual environments. When a user is stationary, the simulation engine 500 is continuously rendering captured and synthetic visual content. During a transition, the simulation engine 500 must also update the display in response to the change in the user's orientation and position. The rendering operations involved in changing the user's viewpoint require time to propagate information and perform computations, which can cause an undesirable amount of latency.

The simulation engine 500 attempts to prevent such problems by using the contextual analysis module 508 to identify an optimal sensor configuration that provides the best quality XR visual content without overloading system resources. In some embodiments, the contextual analysis module 508 searches for an optimal sensor configuration by running simulations using sensor data from different subsets of sensors from the sensor network 516 and different subsets of virtual sensors from the virtual sensors of the tracking module 504. In some embodiments, the contextual analysis module 508 identifies optimal sensor configuration for each of the identified contexts such that a first context has a first optimal sensor configuration, a second context has a second optimal sensor configuration, and so on for each context. Once the contextual analysis module 508 identifies an optimal sensor configuration for a context, the contextual analysis module 508 generates a synchronization rule corresponding to the optimal sensor configuration and stores the rule in a knowledge corpus 512.

Over time the sensor network 516 may change due to sensors being added, removed, relocated, reconfigured, etc. For this reason, the quality analysis module 510 continuously monitors the quality of the rendered output to detect quality issues, such as excessive latency or poor image quality. If the quality analysis module 510 detects a quality issue, it flags the corresponding synchronization rule in the knowledge corpus 512 as needing improvement. In some embodiments, the quality analysis module 510 attempts to identify an updated sensor configuration that will fix the quality issue, and then generates an updated synchronization rule corresponding to the updated sensor configuration and stores the updated rule in the knowledge corpus 512. In alternative embodiments, the contextual analysis module 508 detects the flagged rule and, responsive to detecting the flag, updates the sensor configuration to fix the quality issue. The contextual analysis module 508 then generates an updated synchronization rule corresponding to the updated sensor configuration and stores the updated rule in the knowledge corpus 512. In some embodiments, the contextual analysis module 508 or quality analysis module 510 attempts to identify an updated sensor configuration that will fix the quality issue by running simulations using sensor data from different subsets of sensors from the sensor network 516 and different subsets of virtual sensors from the virtual sensors of the tracking module 504.

Figure 6:
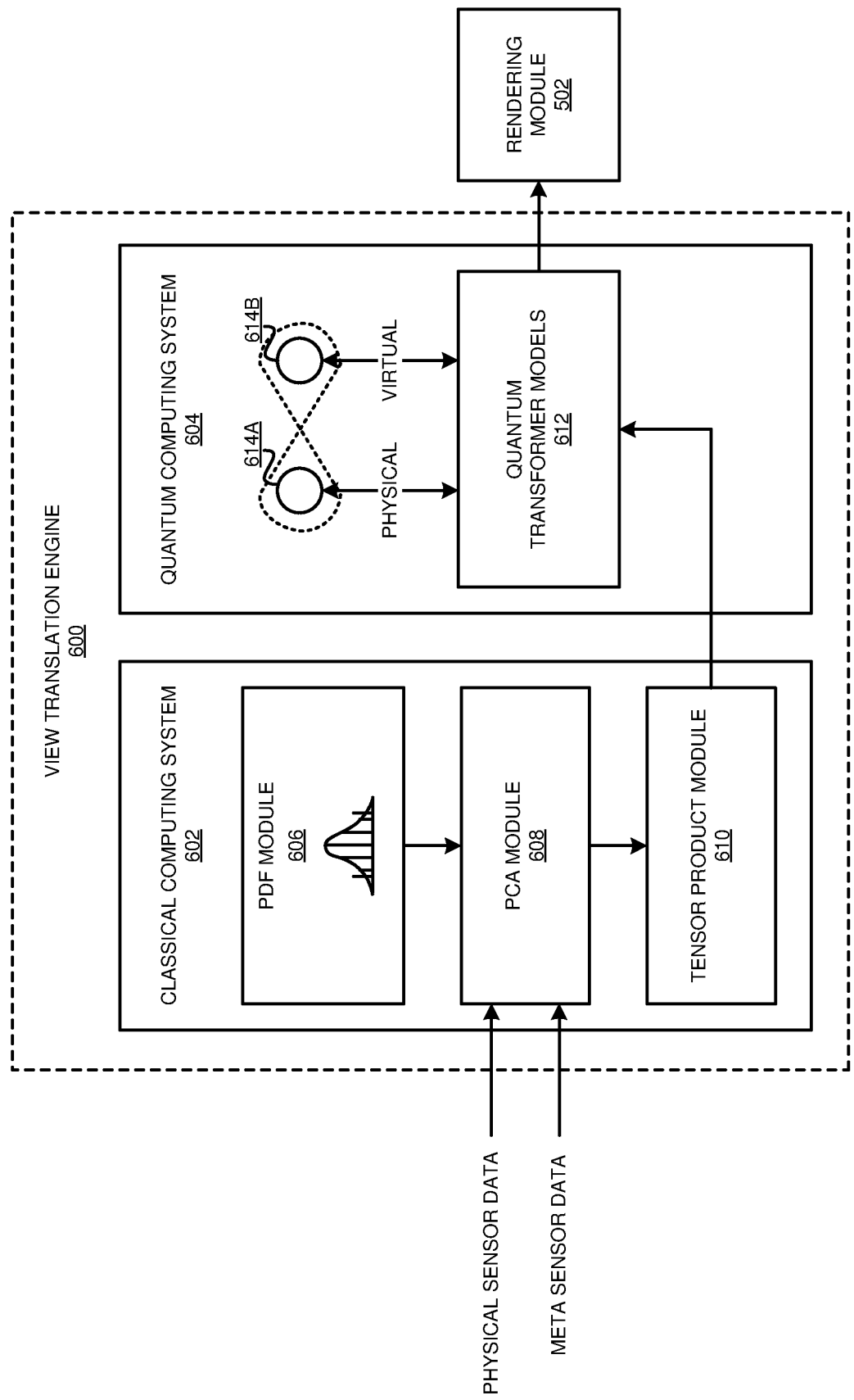
FIG. 6 depicts a block diagram of an exemplary view translation engine in accordance with an illustrative embodiment.

With reference to FIG. 6, this figure depicts a block diagram of an exemplary view translation engine 600 in accordance with an illustrative embodiment. In a particular embodiment, the view translation engine 600 is an example of view translation engine 506 of FIG. 5.

In some embodiments, the view translation engine 600 includes a classical computing system 602 and a quantum computing system 604. The classical computing system 602 comprises a probability distribution function (PDF) module 606, a principal component analysis (PCA) module 608, and a tensor product module 610. The quantum computing system 604 comprises one or more quantum transformer models 612. In alternative embodiments, the view translation engine 600 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

The illustrative embodiment of the view translation engine 600 provides for synchronizing objects in the physical and virtual environments using quantum entanglement. In some embodiments, the PCA module 608 receives physical sensor data (e.g., from the sensor network 516 of FIG. 5) and meta sensor data (e.g., virtual sensors of tracking module 504 of FIG. 5). For example, in some embodiments, the physical sensor data includes video or a series of images of a physical environment captured by one or more cameras. In some embodiments, the PCA module 608 also receives a context identified by the contextual analysis module 508 that is associated with the sensor data. In some embodiments, the PCA module 608 receives or accesses a synchronization rule for the identified context from the knowledge corpus 512.

The PCA module 608 then selects principal components from the physical sensor data and from the virtual sensor data according to the synchronization rule.

In some embodiments, user behaviors such as dwell time and their answers to experience-based questions produce multiple normal distributions that relate to the probability that they are adjusting to the new viewpoint after a transition. A percentage of entanglement for a user is extracted by sampling from such a probability distribution function (PDF) module PDF module 606. The resulting sampling percentage, as well as the feature vectors of principal components from the PCA module 608, are provided to the tensor product module 610. The tensor product module 610 uses the sampling percentage to create a mask on which the tensor product module 610 tensors together feature vectors of physical objects with feature vectors of corresponding virtual objects. The feature vectors of any remaining virtual objects are tensored over themselves to maintain an original size of a Hilbert space.

The resulting tensored space from the tensor product module 610 is mapped to a Hilbert space by trained quantum transformer models 612 resulting in entangled feature vectors. More specifically, a first group of qubits (e.g., qubit 614A) are associated with a feature vector of a physical object detected by sensors in a physical environment (e.g., sensor network 516 of FIG. 5). A second group of qubits (e.g., qubit 614B) are associated with a virtual object that corresponds to the physical object. For example, the physical object may be the tennis ball 406 of FIG. 4, and the corresponding virtual object may be a computer-generated version of the tennis ball that will be synchronized with the tennis ball 406.

The synchronization is facilitated by quantum entanglement. Each qubit of the first group of qubits is entangled with a respective qubit of the second group of qubits resulting in a group of entangled qubits known as Bell pairs. In some embodiments, the qubits of the first group, including qubit 614A, are entangled with respective qubits of the second group of qubits, including qubit 614B, using a known entanglement process for entangling two qubits to create a Bell pair. Continuing with the tennis ball example, the first qubit 614A may represent a feature, such as location, that is continuously being updated according to changes detected in the physical sensor data. For example, in some embodiments, the physical sensor data is generated by a camera in the form of a video feed comprising a series of video frames. In some such embodiments, a first value of the feature (e.g., location) of the tennis ball is detected in a first frame, a second value of the feature of the tennis ball is detected in a second frame, and so on, with the quantum state of the first qubit 614A being continuously updated based on the values of the feature in each successive frame. The changes to the first qubit 614A are automatically reflected by corresponding changes to the quantum state of the second qubit 614B due to the entanglement between the first qubit 614A and the second qubit 614B. This feature information can then be read out and provided to the rendering module 502 to update a property (e.g., the location) of the virtual tennis ball.

Thus, in disclosed embodiments, the Hilbert space allows for entanglement between the virtual and the physical world. Quantum computing provides the ability to create entanglement so that disclosed embodiments can track behaviors between two seemingly separate environments. Using quantum computing, an entangled pair of qubits have a relationship that is very closely correlated with each other. When two or more qubits are entangled, no matter how far apart they are in space, their states remain linked such that they share a common, unified quantum state. As a result, observations of one of the entangled qubits automatically provide information about the other one of the entangled qubits. Since one of the entangled qubits is associated with a physical object and the other one of the entangled qubits is associated with a corresponding virtual object, any action to the physical object will invariably impact the corresponding virtual object. Thus, the entanglement provides a frictionless environment of synchronizing the virtual objects with their corresponding physical objects so that they more closely match the results of the physical environment.

Figure 7:
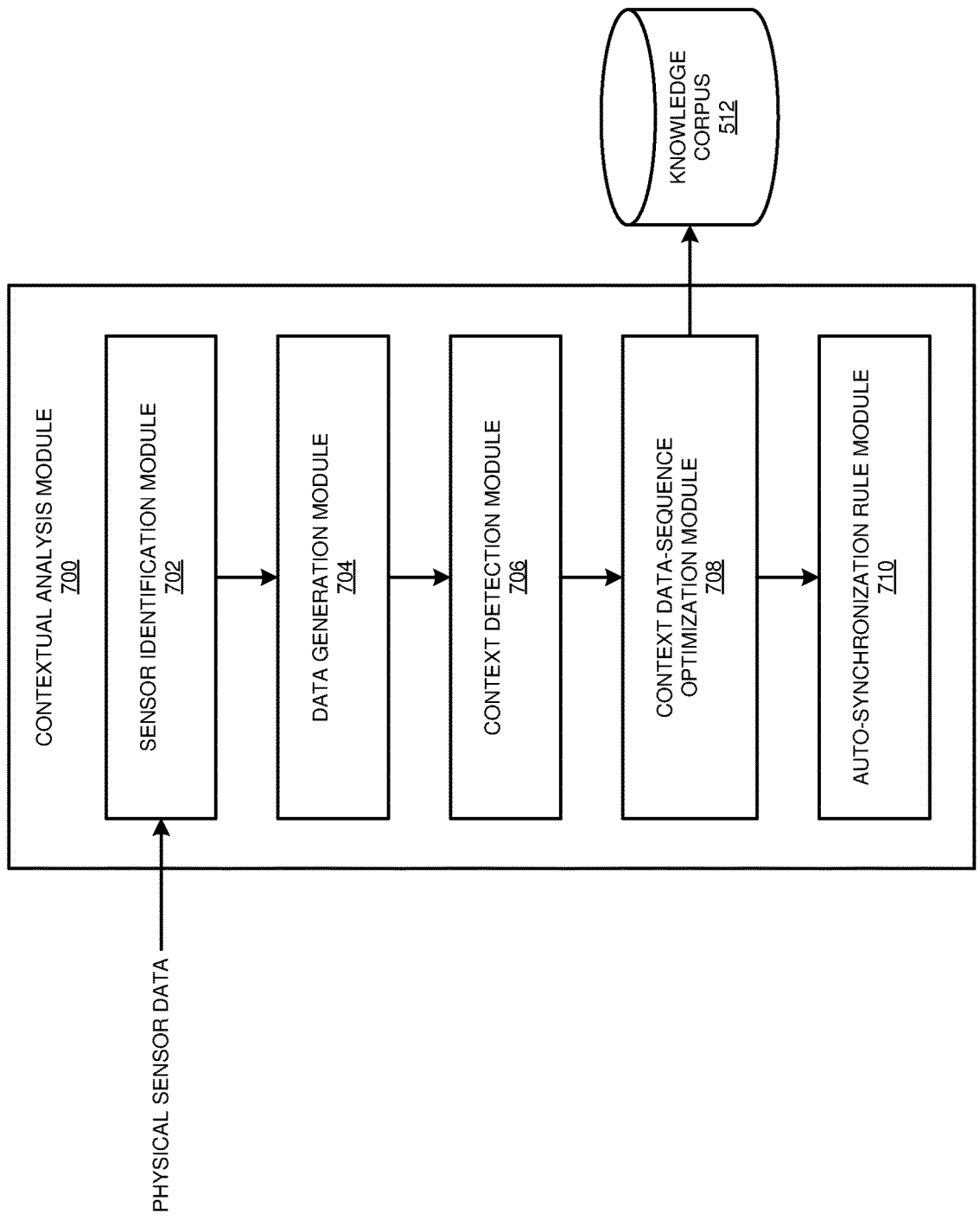
FIG. 7 depicts a block diagram of an exemplary contextual analysis module in accordance with an illustrative embodiment.

With reference to FIG. 7, this figure depicts a block diagram of an exemplary contextual analysis module 700 in accordance with an illustrative embodiment. In a particular embodiment, the contextual analysis module 700 is an example of contextual analysis module 508 of FIG. 5.

In some embodiments, the contextual analysis module 700 includes a sensor identification module 702, a data generation module 704, a context detection module 706, a context data-sequence optimization module 708, and an auto-synchronization rule module 710 that read and write data to one or more computer readable storage media, such as a database storing a knowledge corpus 512. In alternative embodiments, the contextual analysis module 700 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the sensor data from the sensor network 516 and/or tracking module 504 is provided to the sensor identification module 702. In some embodiments, the sensor data originates from a plurality of different sensors. In some embodiments, the sensor data may originate from hundreds or thousands of sensors of various types generating varying amounts of data at varying rates. The sensor identification module 702 associates each received block of data with its particular source sensor. In some embodiments, the sensor identification module 702 extracts metadata from a block of data that includes an identifier associated with the sensor that generated that block of data.

In some implementations or scenarios, the amount and frequency of incoming sensor data may overload system resources during the rendering process, resulting in degraded performance that can negatively affect the user experience. This is often a problem during user transitions, for example when the user is transitioning between different views, such as between the physical and virtual environments or between different locations in a virtual environment.

The contextual analysis module 700 attempts to prevent such problems by identifying an optimal sensor configuration that provides the best quality XR visual content without overloading system resources. In some embodiments, the contextual analysis module 700 searches for an optimal sensor configuration by running simulations using sensor data from different subsets of sensors identified by the sensor identification module 702. In some embodiments, the data generation module 704 generates simulation data for simulating rendering XR visual content and periodically switching between the different subsets of sensors.

The context detection module 706 is configured to analyze the sensor data and identify a context associated with the sensor data. In some embodiments, the context detection module 706 uses known machine learning techniques to determine higher-level context descriptions from the received sensor data. In some embodiments, the context detection module 706 determines a context by analyzing the cultural, historical, and situational aspects surrounding the sensor data. The specificity of the identified context may vary according to factors that are implementation-specific, such as system parameters, user preferences, and typical usage. As non-limiting examples, in some embodiments, the context detection module 706 differentiates a business context (e.g., virtual business meeting) from a recreational context (e.g., sporting event), differentiates types of recreational events (e.g., concert, sporting event, amusement park, or museum tour), and/or differentiates types of sporting events (e.g., tennis, badminton, rugby, or football).

In some embodiments, the context data-sequence optimization module 708 identifies an optimal sensor configuration for each of the contexts identified by the context detection module 706 such that a first context has a first optimal sensor configuration, a second context has a second optimal sensor configuration, and so on for each context. Once the context detection module 706 identifies an optimal sensor configuration for a context, the auto-synchronization rule module 710 generates a synchronization rule corresponding to the optimal sensor configuration and stores the rule in a knowledge corpus 512.

Figure 8:
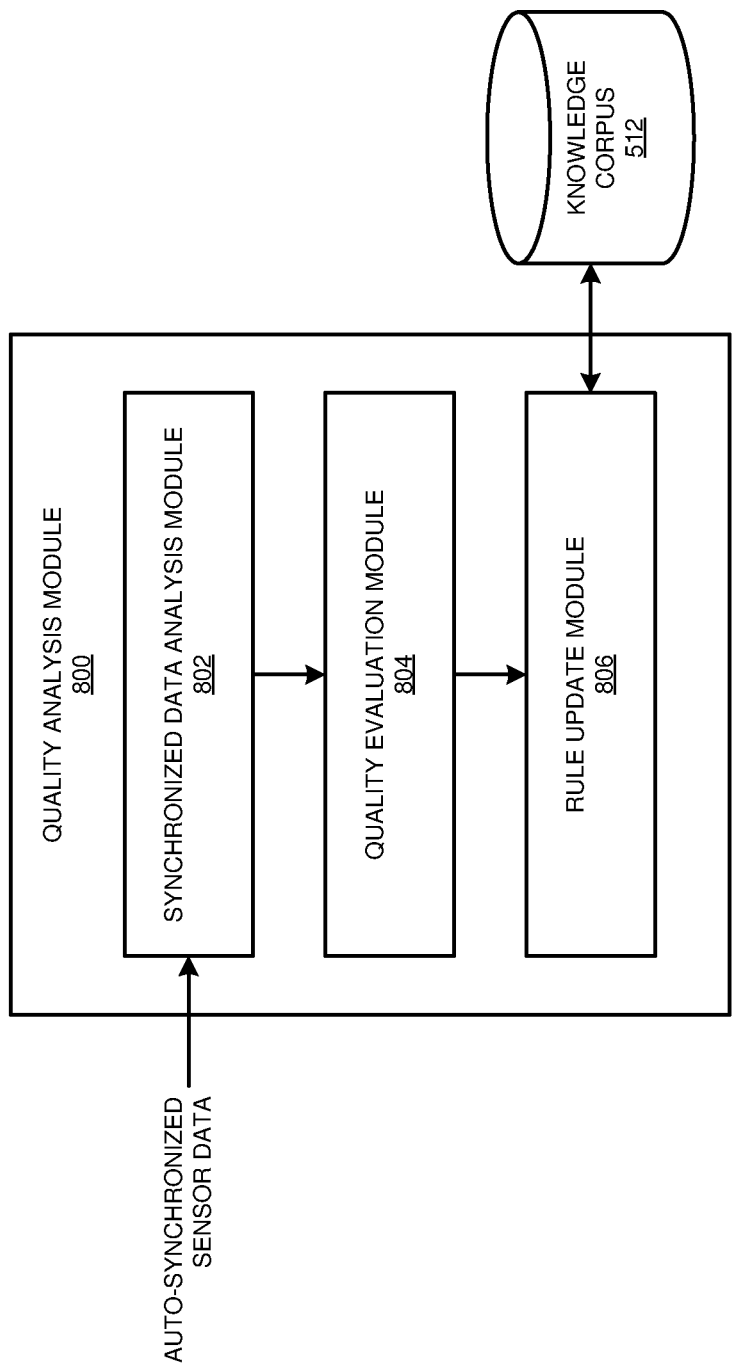
FIG. 8 depicts a block diagram of an exemplary quality analysis module in accordance with an illustrative embodiment.

With reference to FIG. 8, this figure depicts a block diagram of an exemplary quality analysis module 800 in accordance with an illustrative embodiment. In a particular embodiment, the quality analysis module 800 is an example of quality analysis module 510 of FIG. 5.

In some embodiments, the quality analysis module 800 includes a synchronized data analysis module 802, a quality evaluation module 804, and a rule update module 806 that read and write data to one or more computer readable storage media, such as a database storing a knowledge corpus 512. In alternative embodiments, the quality analysis module 800 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

Over time the sensor network 516 may change due to sensors being added, removed, relocated, reconfigured, etc. For this reason, the synchronized data analysis module 802 continuously monitors the quality of the rendered output to detect quality issues, such as excessive latency or poor image quality. If the synchronized data analysis module 802 detects a quality issue, it flags the corresponding synchronization rule in the knowledge corpus 512 as needing improvement. In some embodiments, the quality evaluation module 804 attempts to identify an updated sensor configuration that will fix the quality issue, and then the rule update module 806 generates an updated synchronization rule corresponding to the updated sensor configuration and stores the updated rule in the knowledge corpus 512. In alternative embodiments, the contextual analysis module 508 (FIG. 5) detects the flagged rule and, responsive to detecting the flag, updates the sensor configuration to fix the quality issue. The contextual analysis module 508 then generates an updated synchronization rule corresponding to the updated sensor configuration and stores the updated rule in the knowledge corpus 512 (FIG. 5). In some embodiments, the contextual analysis module 508 (FIG. 5) or quality evaluation module 804 attempts to identify an updated sensor configuration that will fix the quality issue by running simulations using sensor data from different subsets of sensors from the sensor network 516 and different subsets of virtual sensors from the virtual sensors of the tracking module 504.

Figure 9:
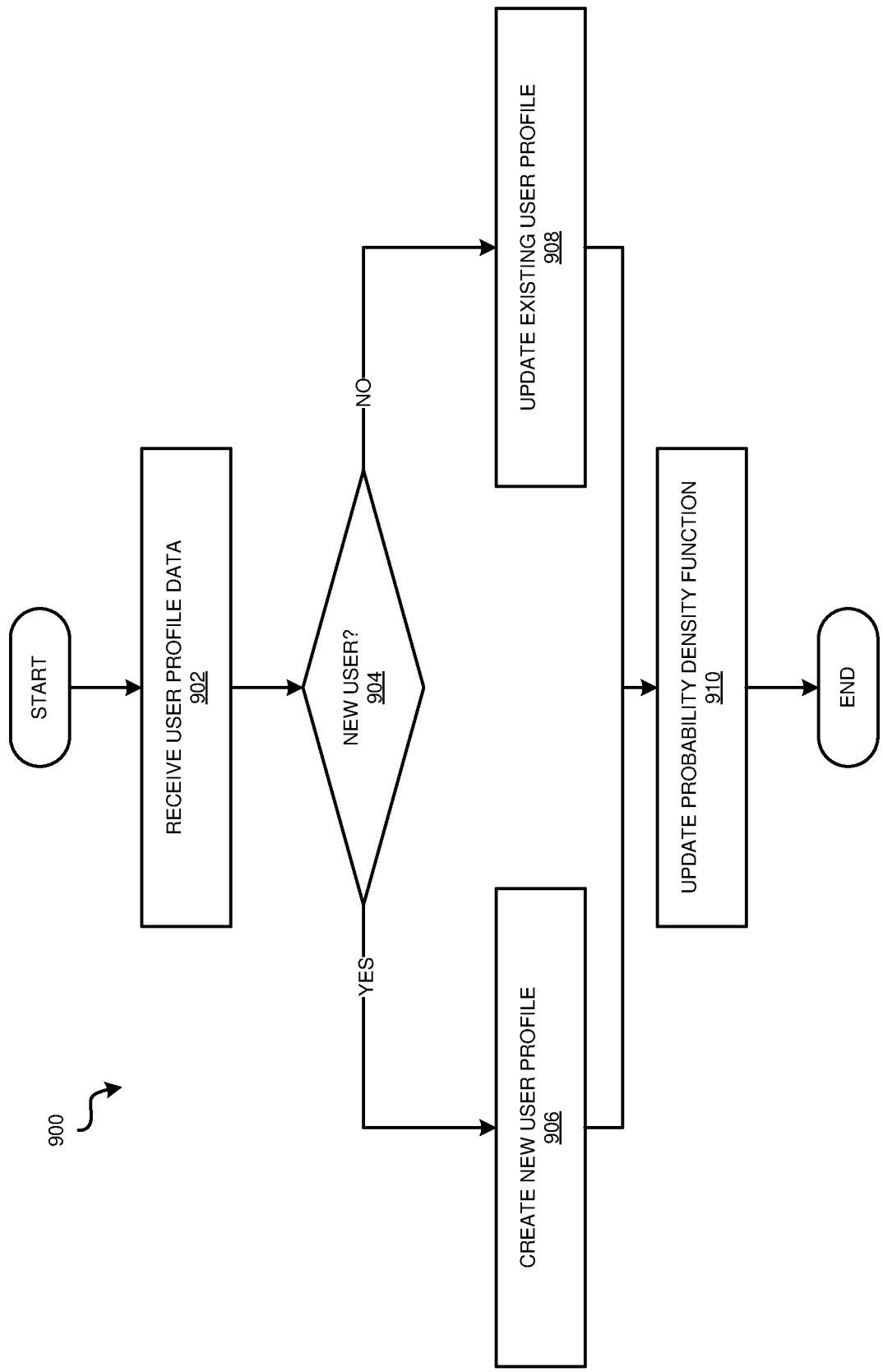
FIG. 9 depicts a flowchart of an example process for maintaining a probability density function in accordance with an illustrative embodiment.

With reference to FIG. 9, this figure depicts a flowchart of an example process 900 for maintaining a probability density function in accordance with an illustrative embodiment. In some embodiments, the process 900 maintains a probability density function used for determining a probability of a user transitioning between a first view and a second view based on inputs representative of user actions. In a particular embodiment, the simulation engine 310 carries out the process 900.

In an embodiment, at block 902, the process receives user profile data. Next, at block 904, the process determines if the user profile is for a new user. If yes at block 904, then at block 906, the process creates a new user profile. Otherwise, if no at block 904, then at block 908, the process updates an existing user profile. Next, at block 910, the process updates a probability density function based on the received user profile data.

Figure 10:
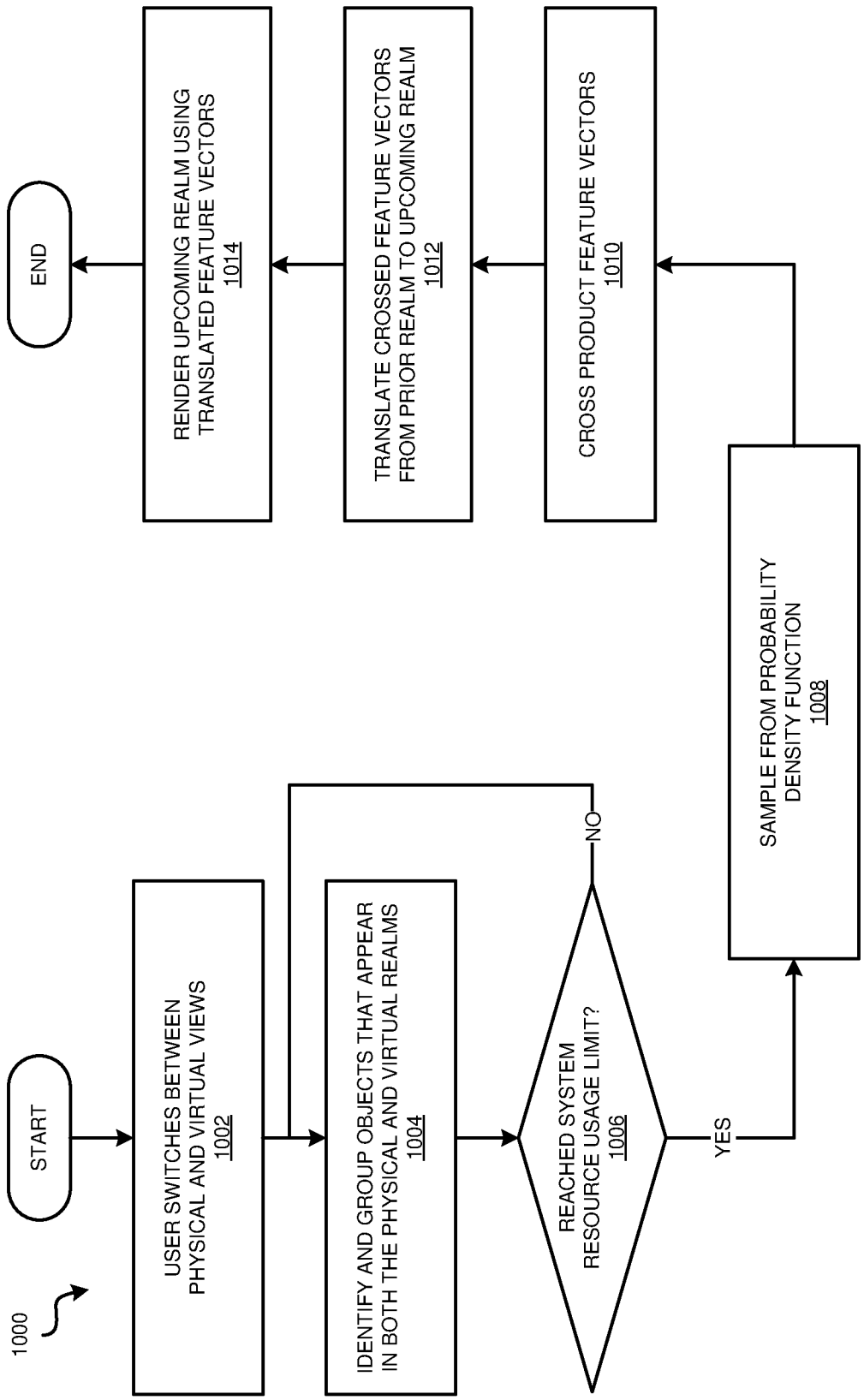
FIG. 10 depicts a flowchart of an example process for performing a frictionless transition between first and second user views.

With reference to FIG. 10, this figure depicts a flowchart of an example process 1000 for performing a frictionless transition between first and second user views. In a particular embodiment, the simulation engine 310 carries out the process 1000.

At block 1002, the process monitors user activity while the user is engaged in using a disclosed system. Next, at blocks 1004 and 1006, the process identifies and groups objects that appear in both the physical and virtual realms until the process determines that crossing all of the identified objects will result in reaching system resource usage limit(s). Next, at block 1008, the process samples from a probability density function in order to determine a probability of the user transitioning between a first view and a second view based on inputs representative of user actions. Next, at block 1010, the process crosses feature vectors of physical objects with respective feature vectors of corresponding virtual objects for all objects detected to be trackable within system resources at blocks 1004 and 1006. In some embodiments, feature vectors of any remaining physical objects are crossed with themselves, and feature vectors of any remaining virtual objects are crossed with themselves. Next, at block 1012, the process translates the crossed feature vectors from the first view to the second view. Next, at block 1014, the process renders objects for the second view using the translated feature vectors.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
   detecting, in data of a first object in a first environment, a feature of the first object in a first frame of the data;
   encoding a first qubit with a first quantum state based on a first value of the feature of the first object;
   entangling the first qubit with a second qubit forming an entangled qubit pair;
   detecting a second quantum state of the second qubit of the entangled qubit pair; and
   rendering computer-generated content of a virtual environment that includes a computer-generated first virtual object that corresponds to the first object,
   wherein the rendering comprises determining a property of the first virtual object based on the detected second quantum state.

2. The computer implemented method of claim 1, further comprising:
   detecting a second value of the feature of the first object in a second frame of the data; and
   updating the first quantum state of the first qubit based on the second value of the feature.

3. The computer implemented method of claim 2, further comprising:
   detecting a change to the second quantum state of the second qubit, wherein the change results from the updating of the first quantum state of the first qubit while the first qubit is entangled with the second qubit.

4. The computer implemented method of claim 3, further comprising:
   changing a property of the first virtual object based on the detected change to the second quantum state of the second qubit.

5. The computer implemented method of claim 1, further comprising:
   determining a probability of a user transitioning between a first view and a second view based on inputs representative of user actions.

6. The computer implemented method of claim 5, wherein the transitioning between the first view and the second view comprises transitioning between the first environment and the virtual environment.

7. The computer implemented method of claim 5, wherein the transitioning between the first view and the second view comprises transitioning between virtual locations in the virtual environment.

8. The computer implemented method of claim 5, further comprising:
   determining that the probability exceeds a threshold value; and
   establishing, responsive to the probability exceeding the threshold value, a device window for both the virtual environment and the first environment based on data associated with the user.

9. The computer implemented method of claim 8, further comprising:
   detecting a set of objects in the first environment based on sensor data of the first environment, wherein the sensor data comprises the data of the first environment, and wherein the set of objects comprises the first object.

10. The computer implemented method of claim 9, further comprising:
    detecting a set of virtual objects in the virtual environment corresponding to respective objects in the set of objects, wherein the set of virtual objects comprises the first virtual object.

11. The computer implemented method of claim 10, wherein the establishing of the device window comprises selecting a first subset of objects from the set of objects in the first environment and a corresponding first subset of virtual objects from the set of virtual objects in the virtual environment.

12. The computer implemented method of claim 11, further comprising:
    encoding a first set of qubits with respective quantum states, wherein the quantum states are based on feature values of respective objects in the first subset of objects, wherein the encoding of the first set of qubits comprises updating the encoding of the first qubit.

13. The computer implemented method of claim 12, wherein the entangling of the first qubit with the second qubit comprises entangling the first set of qubits with respective qubits of a second set of qubits resulting in a set of entangled qubit pairs.

14. The computer implemented method of claim 13, further comprising:
    rendering the transitioning between the first view and the second view, wherein the rendering of the transitioning comprises crossing feature vectors for the first subset of objects with respective feature vectors for the first subset of corresponding virtual objects.

15. The computer implemented method of claim 14, wherein the rendering of the transitioning further comprises:
    identifying, in the set of objects, a second subset of objects not in the first subset of objects and a second subset of virtual objects not in the first subset of virtual objects;
    crossing feature vectors for the second subset of physical objects with themselves; and
    crossing feature vectors for the second subset of virtual objects with themselves.

16. A computer program product, the computer program product comprising one or more computer readable storage media medium, and program instructions collectively stored on the one or more computer readable storage media medium, the program instructions executable by one or more processors to cause the one or more processors to perform operations comprising:
    detecting, in data of a first object in a first environment, a feature of the first object in a first frame of the data;
    encoding a first qubit with a first quantum state based on a first value of the feature of the first object;

entangling the first qubit with a second qubit forming an entangled qubit pair;

detecting a second quantum state of the second qubit of the entangled qubit pair; and rendering computer-generated content of a virtual environment that includes a computer-generated first virtual object that corresponds to the first object, wherein the rendering comprises determining a property of the first virtual object based on the detected second quantum state.

17. The computer program product of claim 16, wherein the stored program instructions are stored in a computer readable storage device medium in a data processing system, and wherein the stored program instructions are transferred over a network from a remote data processing system.

18. The computer program product of claim 16, wherein the stored program instructions are stored in a computer readable storage device medium in a server data processing system, and wherein the stored program instructions are downloaded in response to a request over a network to a remote data processing system for use in a computer readable storage device medium associated with the remote data processing system, further comprising:

program instructions to meter use of the program instructions associated with the request; and program instructions to generate an invoice based on the metered use.

19. The computer program product of claim 16, further comprising:

detecting a second value of the feature of the first object in a second frame of the data; and updating the first quantum state of the first qubit based on the second value of the feature.

20. A computer system comprising a processor and one or more computer readable storage media medium, and program instructions collectively stored on the one or more computer readable storage media medium, the program instructions executable by the processor to cause the processor to perform operations comprising:

detecting, in data of a first object in a first environment, a feature of the first object in a first frame of the data;

encoding a first qubit with a first quantum state based on a first value of the feature of the first object;

entangling the first qubit with a second qubit forming an entangled qubit pair;

detecting a second quantum state of the second qubit of the entangled qubit pair; and rendering computer-generated content of a virtual environment that includes a computer-generated first virtual object that corresponds to the first object, the rendering comprises determining a property of the first virtual object based on the detected second quantum state.

* * * * *